(12) United States Patent
Tian et al.

(10) Patent No.: US 11,429,002 B2
(45) Date of Patent: Aug. 30, 2022

(54) DISPLAY PANEL AND DISPLAY DEVICE

(71) Applicant: Shenzhen China Star Optoelectronics Semiconductor Display Technology Co., Ltd., Guangdong (CN)

(72) Inventors: Tian Tian, Guangdong (CN); Ilgon Kim, Guangdong (CN); Bin Zhao, Guangdong (CN); Xin Zhang, Guangdong (CN); Jun Zhao, Guangdong (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 36 days.

(21) Appl. No.: 17/054,800

(22) PCT Filed: Apr. 22, 2020

(86) PCT No.: PCT/CN2020/086074
§ 371 (c)(1),
(2) Date: Nov. 12, 2020

(87) PCT Pub. No.: WO2021/189578
PCT Pub. Date: Sep. 30, 2021

(65) Prior Publication Data
US 2022/0091466 A1    Mar. 24, 2022

(30) Foreign Application Priority Data
Mar. 22, 2020   (CN) ................ 202010204800.0

(51) Int. Cl.
*G02F 1/1362* (2006.01)
*G02F 1/1368* (2006.01)

(52) U.S. Cl.
CPC .. *G02F 1/136222* (2021.01); *G02F 1/136227* (2013.01); *G02F 1/1368* (2013.01); *G02F 1/13685* (2021.01)

(58) Field of Classification Search
None
See application file for complete search history.

(56) References Cited

U.S. PATENT DOCUMENTS

| | | | |
|---|---|---|---|
| 9,575,385 | B2 | 2/2017 | Tomioka |
| 9,759,968 | B2 | 9/2017 | Cho |
| 2015/0228732 | A1 | 8/2015 | Cho et al. |
| 2016/0327843 | A1 | 11/2016 | Tomiokia et al. |

FOREIGN PATENT DOCUMENTS

| | | | | |
|---|---|---|---|---|
| CN | 105097673 | | 11/2015 | |
| CN | 106783876 | | 5/2017 | |
| CN | 110021653 | | 7/2019 | |
| CN | 209460546 | | 10/2019 | |
| CN | 110646967 | * | 1/2020 | .......... G02F 1/1333 |
| CN | 110649967 | | 1/2020 | |

* cited by examiner

*Primary Examiner* — Richard H Kim

(57) ABSTRACT

A display panel and a display device are provided. The display panel includes a first base plate, a second base plate, and a liquid crystal layer. The first base plate includes a first substrate, an array structure layer, a color resistor layer on the array structure layer, and a pixel electrode layer on the color resistor layer. The color resistor layer includes at least three color resistor blocks, each of the color resistor blocks has a first opening. A first via is within the first opening.

14 Claims, 6 Drawing Sheets

DISPLAY PANEL AND DISPLAY DEVICE

RELATED APPLICATIONS

This application is a National Phase of PCT Patent Application No. PCT/CN2020/086074 having International filing date of Apr. 22, 2020, which claims the benefit of priority of Chinese Patent Application No. 202010204800.0 filed on Mar. 22, 2020. The contents of the above applications are all incorporated by reference as if fully set forth herein in their entirety.

FIELD AND BACKGROUND OF THE INVENTION

The present disclosure relates to a display technique, and more particularly, to a display panel and a display device.

The liquid crystal display (LCD) is a widely used flat display. It utilizes liquid crystal switch to modulate the backlight module to display an image.

In the conventional manufacturing process of the COA (color filter on array) panel, a color filter is formed on the matrix and then the pixel electrode layer is formed on the color filter. The pixel electrode layer is connected to the source/drain electrodes of the matrix layer through the via. Because the thickness of the color filter is larger, an opening area needs to be formed on the color filter to form a via at the center of the opening area. Because the material of the color filter layer has liquidity. The edge of the opening area may form a slope of a certain angle and thus shortens the distance between the via and the boundary of the opening area. This makes the size of the opening area not comply with the design rule of the pixel. This influences the manufacturing of the via and thus influences the display effect of the product.

Therefore, a display panel needs to be developed to solve the above issues.

SUMMARY OF THE INVENTION

One objective of an embodiment of the present disclosure is to provide a display panel and a display device to solve the cross-talk issue.

According to an embodiment of the present disclosure, a display panel is disclosed. The display panel includes a first base plate, a second base plate positioned oppositely to the first substrate, and a liquid crystal layer positioned between the first base plate and the second base plate. The first base plate comprises a first substrate, an array structure layer on the first substrate, a color resistor layer on the array structure layer and a pixel electrode layer on the color resistor layer. The color resistor layer comprises at least three color resistor blocks, each of which has a first opening. A first via is within the first opening. At least one compensation portion is positioned near a side edge of the first opening. The pixel electrode layer is electrically connected to the array structure layer through the first via.

Optionally, the compensation portion comprises a first notch, and the first notch and the first opening have an overlapped region.

Optionally, an orthographic projection of the first notch onto the first opening is within the first opening or a color resistor region adjacent to the first opening.

Optionally, the first opening comprises a first side surface and a second side surface adjacent and vertical to the first side surface. A cross-sectional area of the first notch on a first cross-section gradually increases along a direction toward to the second side surface or along a direction toward to the first side surface or along both the direction toward to the second side surface and along the direction toward to the first side surface. The first cross-section and the second side surface are parallel.

Optionally, a shape of the first notch on a first cross-section or a second cross-section comprises a trapezoid, a square, or a rectangular.

Optionally, the compensation portion comprises the first notch far away from the color resistor block and a second notch close to the color resistor block. A cross-sectional area of the first notch on a first cross-section or a second cross-section is smaller than a cross-sectional area of the second notch on the first cross-section or the second cross-section.

Optionally, the compensation portion comprises a blocking layer located at an outer ring of the first opening and the blocking layer is closely adjacent to the color resistor layer.

Optionally, a distance between the first substrate and a first surface of the blocking layer comparatively far from the first substrate is larger than a distance between the first substrate and a surface of the color resistor layer comparatively far from the first substrate. A second surface of the blocking layer that is comparatively close to the first substrate extends from the first opening and a contact surface of the first via to the array structure layer.

Optionally, the second surface of the blocking layer contacts a passivation layer of the array structure layer.

Optionally, the display panel further comprises the second opening, wherein a first side of the second opening is close to the first opening and a second side of the second opening is close to an adjacent color resistor.

According to an embodiment of the present disclosure, a display device is disclosed. The display device comprises a backlight module and an above-mentioned display panel of positioned on the backlight module. The display panel includes a first base plate, a second base plate positioned oppositely to the first substrate, and a liquid crystal layer positioned between the first base plate and the second base plate. The first base plate comprises a first substrate, an array structure layer on the first substrate, a color resistor layer on the array structure layer and a pixel electrode layer on the color resistor layer. The color resistor layer comprises at least three color resistor blocks, each of which has a first opening. A first via is within the first opening. At least one compensation portion is positioned near a side edge of the first opening. The pixel electrode layer is electrically connected to the array structure layer through the first via.

Optionally, an orthographic projection of the first notch onto the first opening is within the first opening or a color resistor region adjacent to the first opening.

Optionally, the first opening comprises a first side surface and a second side surface adjacent and vertical to the first side surface. A cross-sectional area of the first notch on a first cross-section gradually increases along a direction toward to the second side surface or along a direction toward to the first side surface or along both the direction toward to the second side surface and along the direction toward to the first side surface. The first cross-section and the second side surface are parallel.

Optionally, a shape of the first notch on a first cross-section or a second cross-section comprises a trapezoid, a square, or a rectangular.

Optionally, the compensation portion comprises the first notch far away from the color resistor block and a second notch close to the color resistor block. A cross-sectional area of the first notch on a first cross-section or a second cross-section is smaller than a cross-sectional area of the second notch on the first cross-section or the second cross-section.

Optionally, the compensation portion comprises a blocking layer located at an outer ring of the first opening and the blocking layer is closely adjacent to the color resistor layer.

Optionally, a distance between the first substrate and a first surface of the blocking layer comparatively far from the first substrate is larger than a distance between the first substrate and a surface of the color resistor layer comparatively far from the first substrate. A second surface of the blocking layer that is comparatively close to the first substrate extends from the first opening and a contact surface of the first via to the array structure layer.

Optionally, the second surface of the blocking layer contacts a passivation layer of the array structure layer.

Optionally, the display panel further comprises the second opening, wherein a first side of the second opening is close to the first opening and a second side of the second opening is close to an adjacent color resistor.

An embodiment of the present disclosure sets a compensation portion close to the edge of the first opening. Therefore, when the first via, for connecting the pixel electrode layer and the source/drain, is formed in the first opening, the material of the color resistor close to the first opening is prevented from flowing into the first opening. This increases the distance between the first via and the edge of the first opening and makes the size of the first opening comply with the design rule of the pixel. This raises the display effect of the product.

DESCRIPTION OF SPECIFIC EMBODIMENTS OF THE INVENTION

Figure 1:
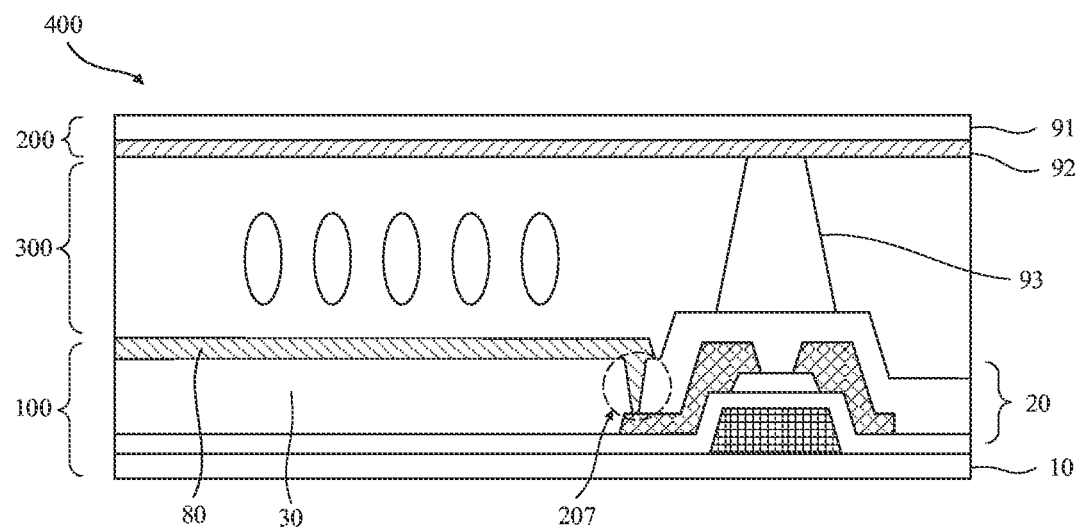
FIG. 1 is a diagram of a display panel according to a first embodiment of the present disclosure.

The invention is described below in detail with reference to the accompanying drawings, wherein like reference numerals are used to identify like elements illustrated in one or more of the figures thereof, and in which exemplary embodiments of the invention are shown. This invention may, however, be embodied in many different forms and should not be construed as limited to the particular embodiments set forth herein. Rather, these embodiments are provided so that this disclosure will be thorough and complete, and will fully convey the scope of the invention to those skilled in the art.

In the conventional manufacturing process of the COA (color filter on array) panel, because the thickness of the color filter is larger, an opening area needs to be formed on the color filter to form a via at the center of the opening area. Because the material of the color filter layer has liquidity. The edge of the opening area may form a slope of a certain angle and thus shortens the distance between the via and the boundary of the opening area. This makes the size of the opening area not comply with the design rule of the pixel. This influences the manufacturing of the via and thus influences the display effect of the product. The present disclosure provides a solution below to solve the above-mentioned issue.

Please refer to FIG. 1-FIG. 12. A display panel 400 comprises a first base plate 100, an oppositely positioned second base plate 200 and a liquid crystal layer 300 between the first base plate 100 and the second base plate 200.

The first base plate comprises a first substrate 10, an array structure 20 on the first substrate, a color resistor layer 30 on the array structure layer 20, and a pixel electrode layer 80 on the color resistor layer 30.

The color resistor layer 30 comprises at least three color resistor blocks. Each of the color resistor blocks has a first opening 40. The first opening 40 has a first via 207 electrically connected to the pixel electrode layer 80 and the array structure layer 20, and a compensation portion positioned near the side edge of the first opening.

In this embodiment, a compensation portion is set near to the side edge of the first opening 40. Therefore, when the first via, for connecting the pixel electrode layer 80 and the source/drain, is formed in the first opening 40, the material of the color resistor close to the first opening 40 is prevented from flowing into the first opening 40. This increases the distance between the first via 207 and the edge of the first opening 40 and makes the size of the first opening 40 comply with the design rule of the pixel. This raises the display effect of the product.

In the following disclosure, the detailed embodiments will be illustrated.

Embodiment 1

Because the present disclosure could solve the problem that the material of color resistor flows into the contact via region of pixel electrode layer 80 and the array substrate layer 20, the first base plate 100 is a COA substrate.

Please refer to FIG. 1, the second base plate 200 comprises a second substrate 91 and a second common electrode layer 92 on the second substrate 91. The liquid crystal layer 300 is positioned between the pixel electrode layer 80 and the second common electrode layer 92.

The first substrate 10 and the second substrate 91 could be one of the rigid substrate and the flexible substrate. When the first substrate 10 and the second substrate 91 are rigid substrates, the first substrate 10 and the second substrate 91 could be made by glass or quartz. When the first substrate 10 and the second substrate 91 are flexible substrates, the first substrate 10 and the second substrate 91 could be made by polyimide. In the LCD display panel, the substrate is often implemented as a rigid substrate. Further illustration is omitted here.

Figure 2:
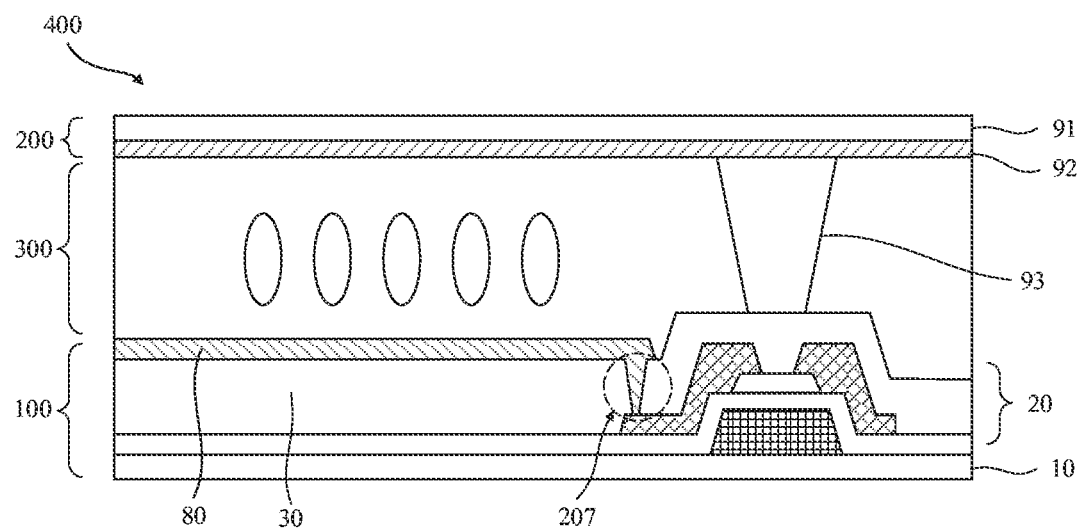
FIG. 2 is a diagram of a display panel according to a second embodiment of the present disclosure.

The array structure layer 20 comprises a plurality of TFTs. The TFTs could be an etch stopper (ES) type, a BCE type, or a top gate TFT type. This is not a limitation of the present disclosure. The TFTs shown in FIG. 1 and FIG. 2 are ordinary bottom gate TFTs and the further illustration of the detailed structures of the TFTs is omitted here for simplicity.

The display panel 400 further comprises the pad layer 93 between the pixel electrode layer 80 and the second common electrode layer 92. As shown in FIG. 1, the pad layer 93 could be positioned on the color resistor layer of the first base plate. Or, as shown in FIG. 1, the pad layer 93 could be positioned on the second base plate. Furthermore, because the following disclosure will illustrate the via structure between the pixel electrode layer 80 and the source/drain, the detailed location of the pad layer 93 is not limited in the following disclosure.

The display panel 400 further comprises a light blocking structure between adjacent color resistors. In the embodiments of FIG. 1 and FIG. 2, the light-blocking structure could be located on the first base plate and the second base plate. This is not a limitation of the present disclosure.

The color resistor layer 30 comprises color resistor blocks of different colors. The color resistor blocks could be one of the red color resistor block, blue color resistor block and green color resistor block.

The display panel 400 further comprises a first via 207 passing through the color resistor layer 30 and the passivation layer 206. The pixel electrode layer 80 is electrically connected to the source/drain of the array structure layer 20 through the first viva 207.

The pixel electrode layer 80 is used to provide a first voltage to rotate the LC molecules. The second common electrode layer 92 is used to provide a second voltage to rotate the LC molecules. The second voltage is a constant voltage. The display panel 400 rotates the LC molecules by different angles through determining the magnitude of the first voltage to change the voltage difference between the LC layers.

The materials of the second common electrode layer 92 and the pixel electrode layer 80 could be, but not limited to, ITO.

In the conventional manufacturing process of COA panel, because the thickness of the color filter layer is larger, an opening area needs to be formed on the color filter before a via is formed to connect the pixel electrode layer 80 and the array structure layer 20. Please refer to FIG. 3 and FIG. 4, the color resistor layer 30 at least comprises the first color resistor block 301 and the second color resistor block 302 which is positioned adjacent to the first color resistor block 301. The first color resistor block 301 and the second color resistor block 302 have different colors.

Each of the first color resistor block 301 and the second color resistor block 302 has the above-mentioned first opening 40. The first opening 40 has the first via 207. As the increase of the resolution of the display panel, the area of the sub-pixel decreases and the area of the first opening 40 is limited. However, in order to ensure the display effect of the panel, the first opening 40 and the first via 207 needs to comply with a certain design rule.

Taking a 8 k definition display panel as an example, the diameter of the first via 207 needs to be longer than 8.5 micrometers. The distance between the edge of the first opening 40 and the first via 207 should be longer than 9 micrometers. However, when the first opening 40 is formed, because the liquidity of the material of the color resistor, the material of the color resistor flows into the first opening 40 such that the distance L1 between the edge of the first opening 40 and the first via 207 does not comply with the design rule. Therefore, please refer to FIG. 3 and FIG. 4, the color resistor layer 30 further comprises at least one compensation portion positioned near the side edge of the first opening 40.

Figure 3:
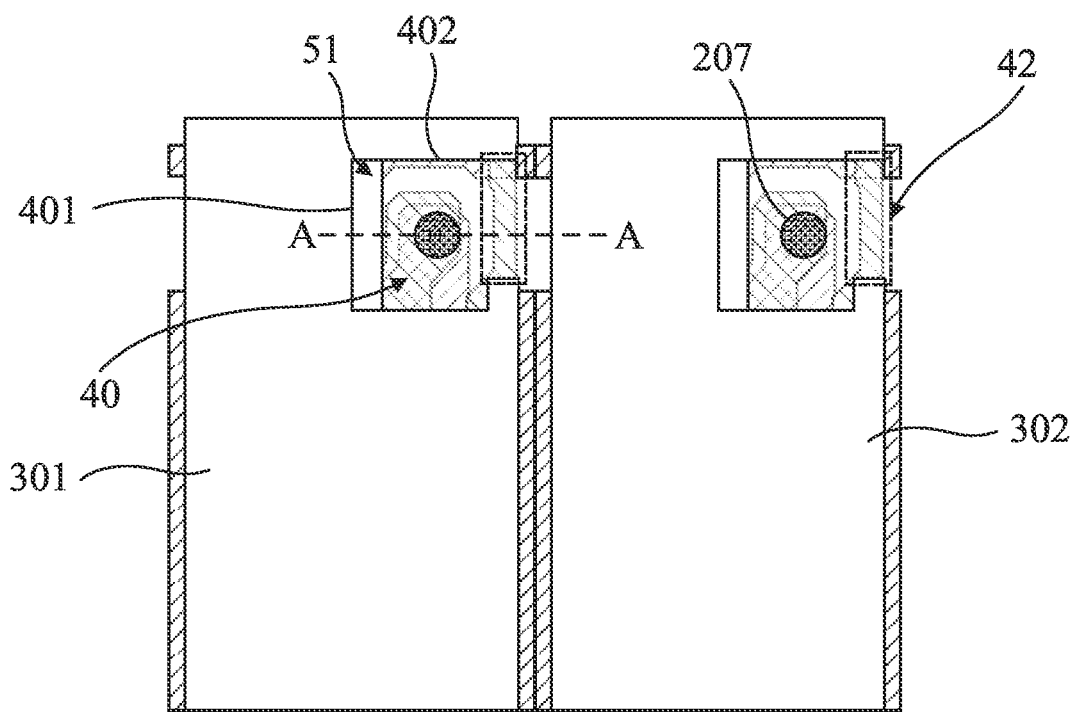
FIG. 3 is a plan view of an array substrate in a display panel according to a first embodiment of the present disclosure.
Figure 4:
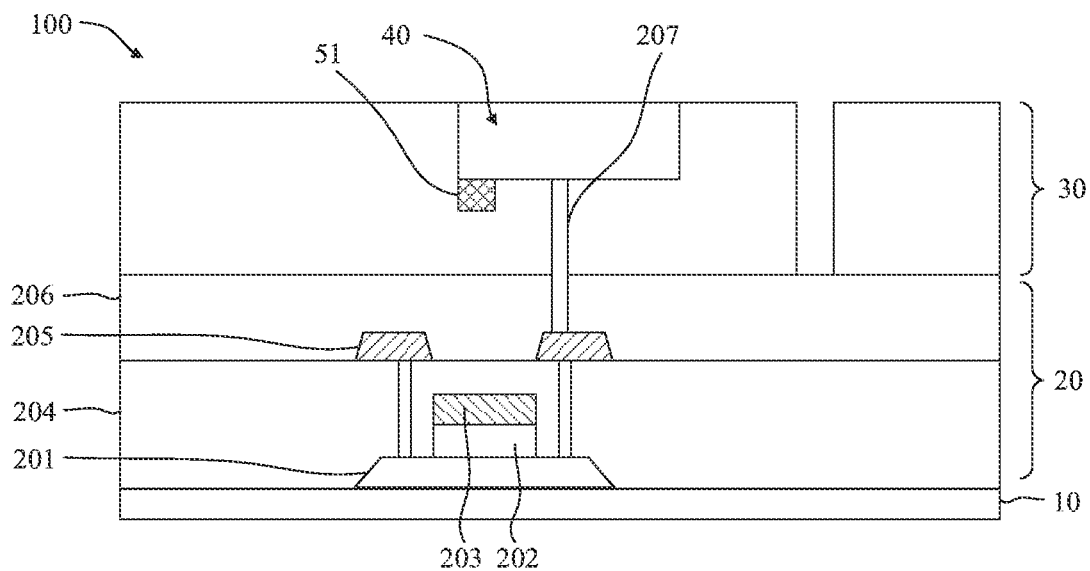
FIG. 4 is a diagram of a cross-section along the line AA in FIG. 3.

Please refer to FIG. 3 and FIG. 4. FIG. 4 is a diagram of a cross-section along the line AA in FIG. 3. In this embodiment, the TFT shown in FIG. 4 is a top gate TFT but this should be regarded as an example, not a limitation of the present disclosure. For example, the TFT could comprise an active layer 201 on the first substrate 10, a gate insulating layer 202 on the active layer 201, a gate layer 203 on the gate insulating layer 202, an in-between insulating layer 204 on the gate layer 203, a source/drain layer 205 on the in-between insulating layer 204, and a passivation layer 206 on the source/drain layer 205.

In this embodiment, the compensation portion comprises a first notch 51. The first notch 51 and the first opening 40 have an overlapped region.

The first notch 51 is positioned closely adjacent to the bottom edge of the first opening 40.

The orthographic projection of the first notch 51 onto the first opening 40 is within the first opening or a color resistor region adjacent to the first opening. There is a certain step difference between the edge of the first opening 40 and the color resistor layer 30. As previously mentioned, the material of the color resistor may flow into the first opening 40 due to its liquidity. Therefore, because of the first notch 51, the material of the color resistor will flow into the first notch 51. This makes the bottom surface of the first opening 40 comparatively flat and ensures the distance between the first via 207 and the edge of the first opening 40. Therefore, the size of the first opening 40 could comply with the design rule of the pixel. This prevents the manufacturing process of the first via 207 from being affected by the first opening 40 and thus ensures the connection between the pixel electrode layer 80 and the array structure 20.

Figure 5:
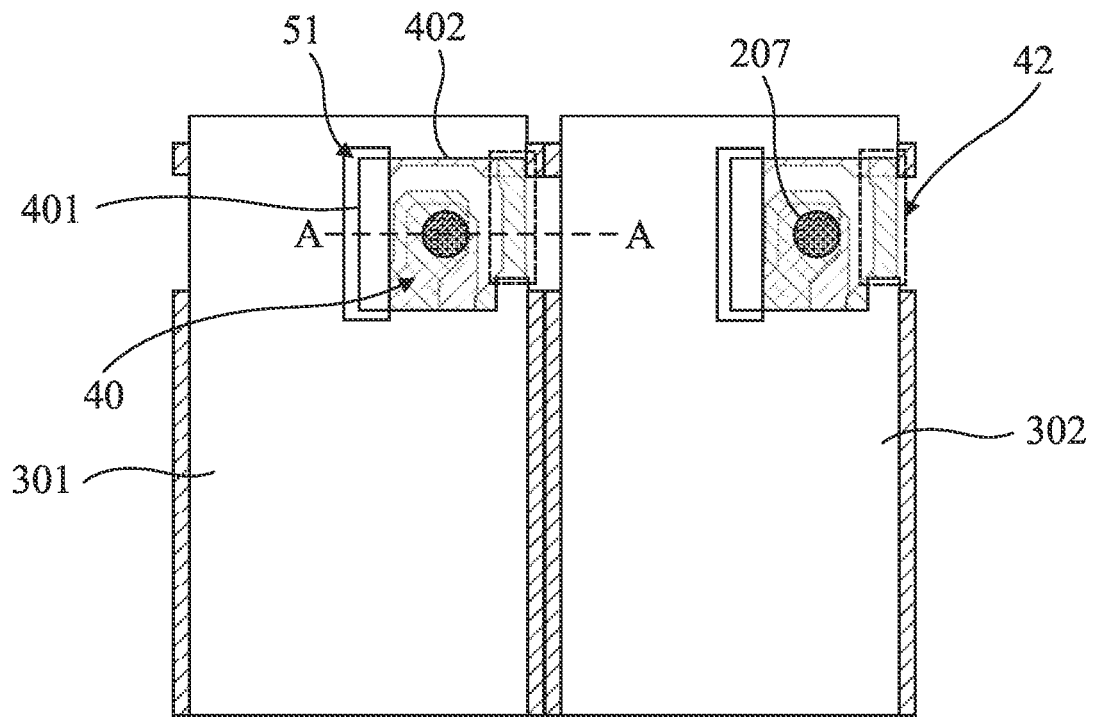
FIG. 5 is a plan view of an array substrate in a display panel according to a second embodiment of the present disclosure.
Figure 6:
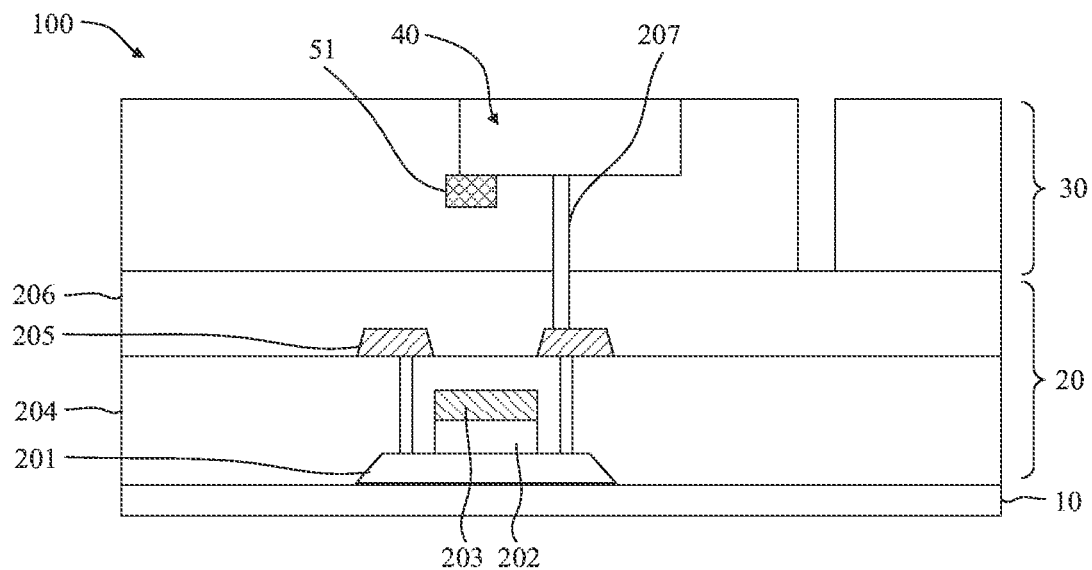
FIG. 6 is a diagram of a cross-section along the line AA in FIG. 5.

Please refer to FIG. 5 and FIG. 6. FIG. 6 is a diagram of a cross-section along the line AA in FIG. 5. In this embodiment, the orthogonal projection of the first notch 51 onto the first opening 40 is within the first opening 40. Furthermore, the orthogonal projection of the first notch 51 onto the first opening 40 is within a color resistor region adjacent to the first opening 40. The dotted line portion is the boundary of the opening of the first notch 51 on the color resistor layer 30

The first opening 40 comprises a first side surface 401 and a second side surface 402 adjacent and vertical to the first side surface. The first notch 51 is near to the first side surface 401 and the second side surface 402. The intersection of the first side surface 401 and the second side surface 402 is where the color resistor material accumulates. In the top corner region, the color resistor material has larger volume and thus has a better liquidity in contrast to that in non-top corner region. Therefore, the top corner region is a color resistor material gradient-concentrated region. In this embodiment, the first notch 51 is positioned at the intersection of the first side surface 401 and the second side surface 402 such that the color resistor material in the top corner region could directly flow into the first notch 51. This makes the bottom surface of the first opening 40 comparatively flat and ensures the distance between the first via 207 and the edge of the first opening 40. This prevents the color resistor material from accumulating in the top corner region to form the gradient. This makes the size of the first opening 40 comply with the design rule and ensures that the first via 207 will not be affected by the color resistor material inside the first opening 40 such that the pixel electrode layer 80 and the array structure layer 20 could be normally connected.

Figure 7:
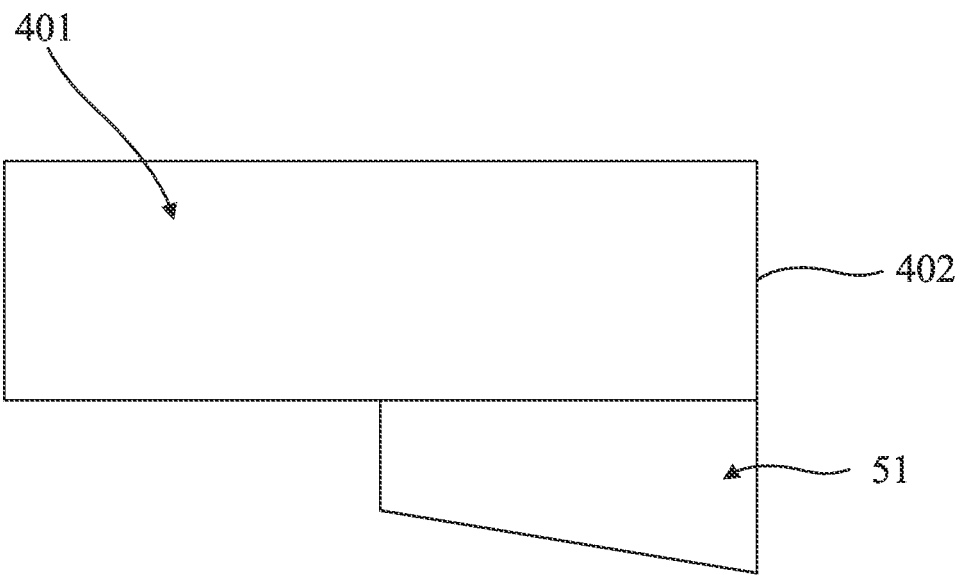
FIG. 7 is a diagram of a first cross-section of a first opening in a display panel according to an embodiment of the present disclosure.
Figure 8:
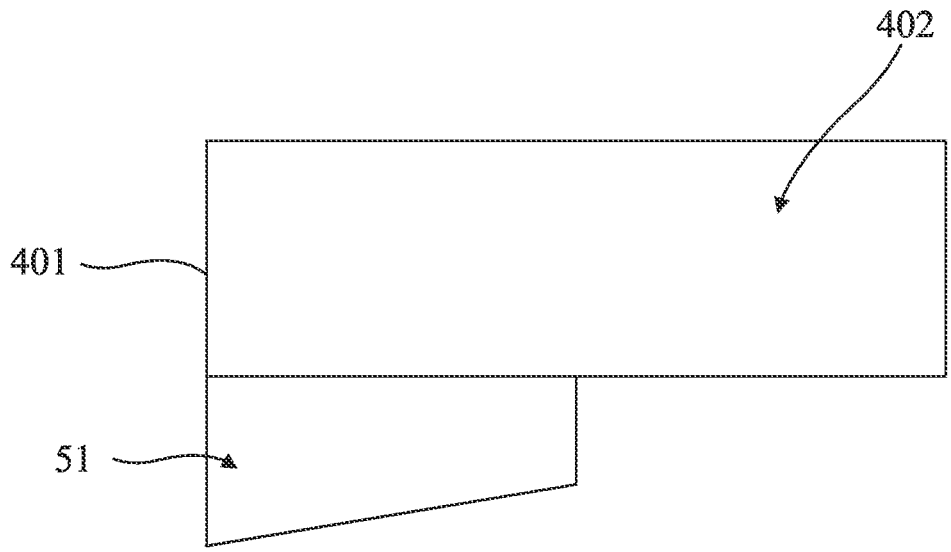
FIG. 8 is a diagram of a second cross-section of a first opening in the display panel according to an embodiment of the present disclosure.

Please refer to FIG. 7. The cross-sectional area of the first notch 51 on the first cross-section gradually increases along a direction toward to the second side surface 402. Please refer to FIG. 8. The cross-sectional area of the first notch 51 on a first cross-section gradually increases along a direction toward to the first side surface 401. Or, FIG. 7 and FIG. 8 could be combined. This means that the cross-sectional area of the first notch 51 on the first cross-section gradually increases along both the direction toward to the second side surface 402 and along the direction toward to the first side surface 401.

The change of the cross-sectional area could be non-linear or linear as long as the overall changing trend is as the above.

The first cross-section and the second side surface 402 are parallel.

In this embodiment, similar to FIG. 5 and FIG. 6, the intersection of the first side surface 401 and the second side surface 402 is where the color resistor material accumulates. In the top corner region, the color resistor material has larger volume and thus has a better liquidity in contrast to that in non-top corner region. Therefore, the top corner region is a color resistor material gradient-concentrated region. In this embodiment, the depth or the width of the first notch 51 corresponding to the top corner region of the first opening is increased to increase the capacity to contain the color resistor material. In this way, the color resistor material accumulated in each region could be contained by the first notch and thus the bottom surface of the first opening 40 comparatively flat. This also ensures the distance between the first via 207 and the edge of the first opening 40 and prevents the color resistor material from accumulating in the edge region to form the gradient. This makes the size of the first opening 40 comply with the design rule and ensures that the first via 207 will not be affected by the color resistor material inside the first opening 40 such that the pixel electrode layer 80 and the array structure layer 20 could be normally connected.

In the above-mentioned embodiments, the shape of the first notch 51 on the first cross-section or the second cross-section comprises one of a trapezoid, a square, or a rectangular.

As shown in FIG. 3, in order to ensure that the opening of the first notch 51 is not overly large, the shape of the first notch 51 on the first cross-section or the second cross-section could be a trapezoid. Without increasing the area of the opening of the first notch 51, the inner capacity of the first notch 51 is increased to prevent the color resistor material from forming a protrusion on the first notch 51.

Figure 9:
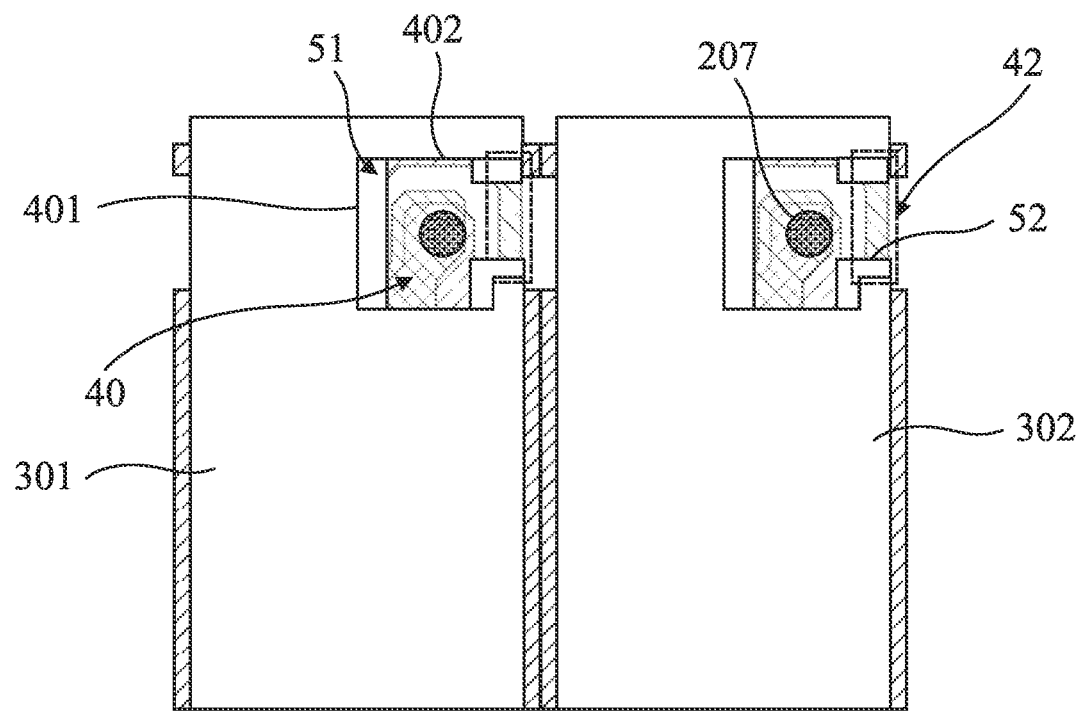
FIG. 9 is a plan view of an array substrate in a display panel according to a third embodiment of the present disclosure.

On the basis of the above-mentioned embodiments, please refer to FIG. 9. The compensation portion comprises the first notch 51 far away from the color resistor block and a second notch 52 close to the color resistor block.

In this embodiment, the cross-sectional area of the first notch 51 on the first cross-section or the second cross-section is smaller than the cross-sectional area of the second notch 52 on the first cross-section or the second cross-section.

Please refer to FIG. 3 and FIG. 5. For COA substrate, there is often a certain gap between adjacent color resistor blocks. For example, there is a gap between the first color resistor block 301 and the second color resistor block 302. In order to facilitate the manufacturing process of the first via 207, the second opening 42 is formed in the region of the first opening 40, which is close to the adjacent color resistor. Therefore, when completing the first opening 40 and the second opening 42, the color resistor material near the second opening 42 may flow into the display area of the display panel 400 through the gap between the first color resistor block 301 and the second color resistor block 302 due to its liquidity. The color resistor material of the first color resistor block 301 may flow to the display area of the second color resistor block 302. This introduces the mixed-color issue to the display panel 400.

Embodiment 2

This embodiment is similar to the first embodiment. The difference is:

In the display panel 400 of this embodiment, the compensation portion comprises a blocking layer 60 located at an outer ring of the first opening 40. The blocking layer 60 is closely adjacent to the color resistor layer.

Figure 10:
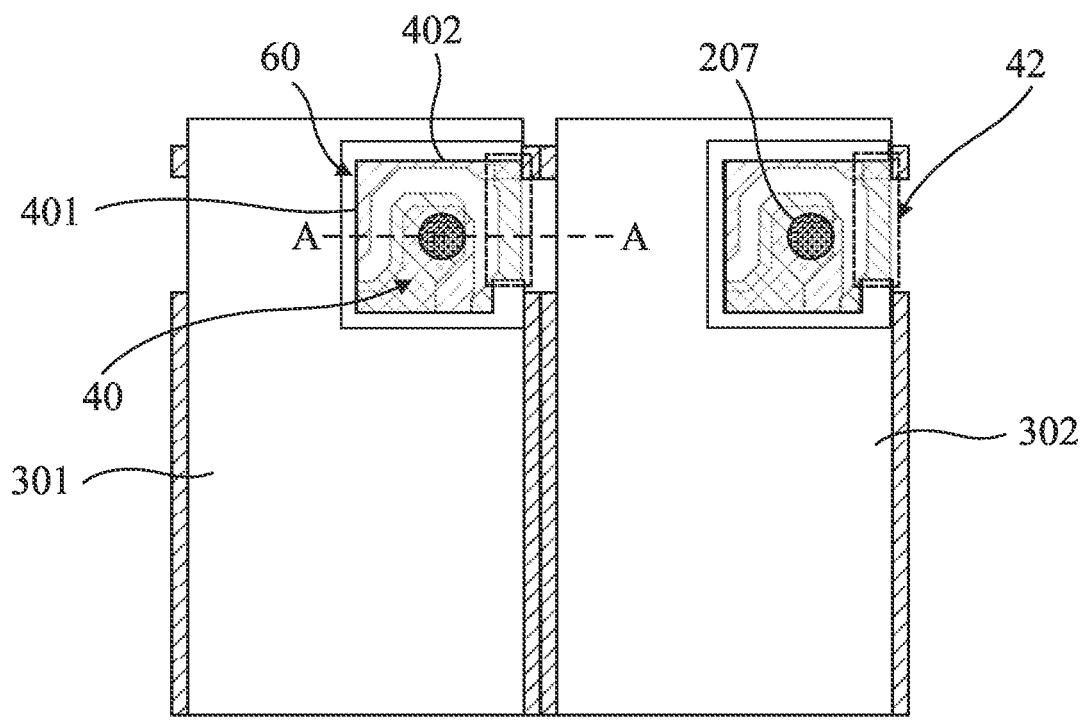
FIG. 10 is a plan view of an array substrate in a display panel according to a fourth embodiment of the present disclosure.
Figure 11:
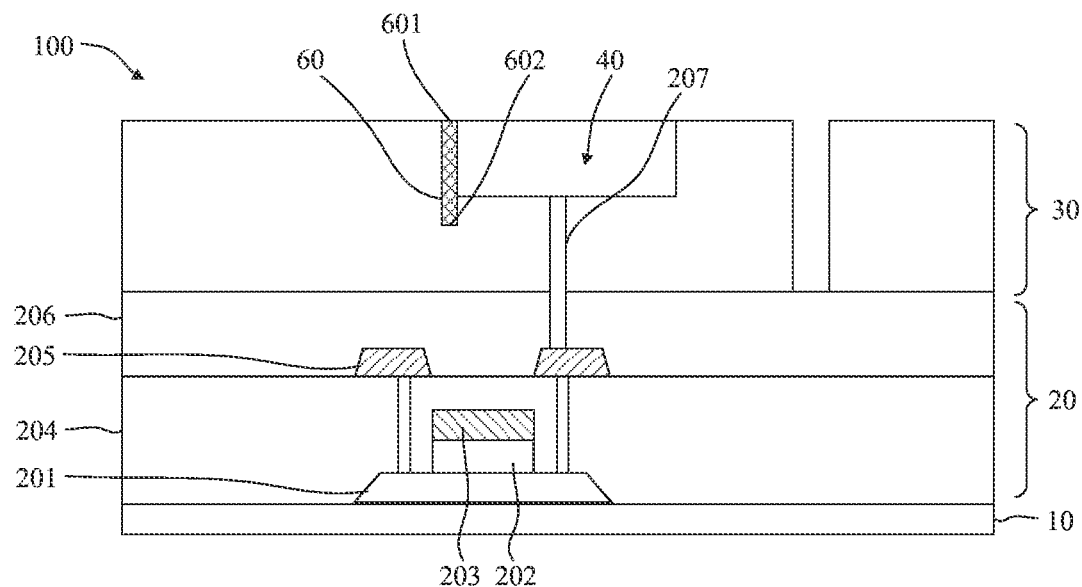
FIG. 11 is a diagram of a cross-section along the line AA in FIG. 10.

Please refer to FIG. 10 and FIG. 11. FIG. 11 is a diagram of a cross-section along the line AA in FIG. 10. In contrast to the first embodiment, the compensation portion is a blocking structure. The blocking layer 60 is located in the color resistor layer 30 and near the first opening 40. Because the edge region of the first opening 40 and the color resistor layer 30 have a certain step difference, the color resistor material will tend to flow into the first opening 40. However, the blocking layer 60 blocks the color resistor material and prevents the color resistor material from flowing into the first opening 40. This makes the bottom surface of the first opening 40 comparatively flat and ensures the distance between the first via 207 and the edge of the first opening 40. This makes the size of the first opening 40 comply with the design rule and ensures that the manufacturing process of the first via 207 will not be affected by the first opening 40 such that the pixel electrode layer 80 and the array structure layer 20 could be normally connected.

In this embodiment, the distance between the first substrate 10 and a first surface 601 of the blocking layer 60 comparatively far from the first substrate 10 is larger than the distance between the first substrate 10 and a surface of the color resistor layer 30 comparatively far from the first substrate 10. This embodiment increases the height of the blocking layer such that the height of the blocking layer 60 is more than the height of the color resistor layer 30. This further prevents the color resistor material from flowing into the first opening 40.

In this embodiment, the second surface 602 of the blocking layer 60 that is comparatively close to the first substrate 10 extends from the first opening 40 and a contact surface of the first via 207 to the array structure layer 20.

Please refer to FIG. 11. The bottom of the blocking layer 60 is lower than the bottom of the first opening 40 and extends toward the array structure layer 20. Due to the liquidity of the color resistor material, even if the blocking layer 60 could block the upper structure of the color resistor layer 30, it is possible that the color resistor material still flows into the first opening 40 through the bottom of the blocking layer 60 if the entire structure is squeezed. Therefore, in this embodiment, the blocking layer 60 further extends toward the array structure layer 20 to further prevent the color resistor material from flowing into the first opening 40.

In an embodiment of the present disclosure, the second surface 602 of the blocking layer 60 contacts a passivation layer 206 of the array structure layer 20. The blocking layer 60 is formed on the array structure layer 20. In the manufacturing process of the array structure layer 20, the blocking layer 60 could be first formed. The blocking layer 60 could completely prevent the invasion of the color resistor material.

Embodiment 3

This embodiment is similar to the embodiment 2 or the embodiment 1. The difference between this embodiment and the embodiment 1 is:

Because there is a gap between adjacent color resistor blocks, in the above-mentioned embodiments, the first protrusion is formed in the region corresponding to the second opening in order to prevent the color resistor material of adjacent color resistor region from flowing into the display region. That is, the first protrusion could prevent the color resistor material from flowing into the gap through the second opening. Here, because the first protrusion also has the issue of color resistor material, the protrusion may also form a gradient and reduce the distance between the first opening and the first via. This makes the size of the first opening not comply with the design rule of the pixel.

Figure 12:
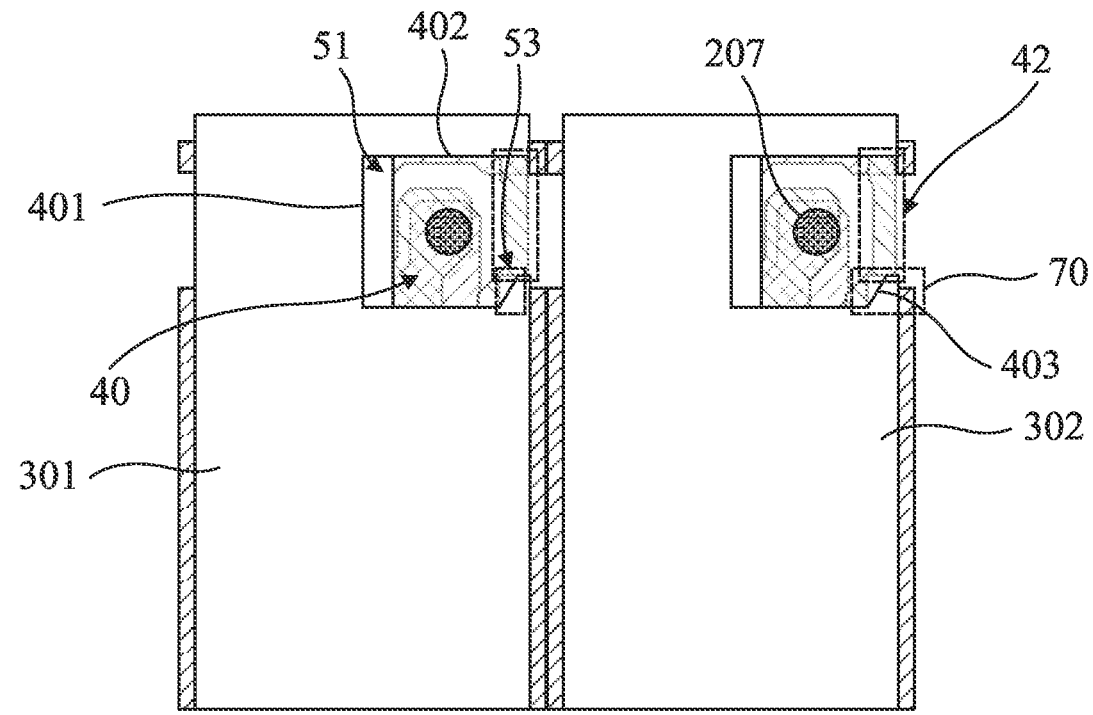
FIG. 12 is a plan view of an array substrate in a display panel according to a fifth embodiment of the present disclosure.

Please refer to FIG. 12. The compensation portion could further comprise the third notch 53 positioned on the first protrusion 70. The third notch 53 is used to remove a partial region of the first protrusion, which is toward the first via 207. This reduces the distance between the first protrusion and the center of the first via 207.

In this embodiment, from the top view of the display panel 400, the third notch 53 could be a triangle. That is, the third notch 53 could be a triangular prism such that the third surface of the first protrusion 70 toward the first via 403 is a flat surface.

In this embodiment, the third notch 53 is positioned on the region of the first protrusion 70, which is toward the first via 207 to remove a part of the color resistor material on the first protrusion 70. Furthermore, it also reduces the distance between the first protrusion 70 and the first via 207 and ensures that the size of the first opening 40 complies with the design rule of the pixel. This prevents the manufacturing process of the first via 207 from being affected by the first opening 40 and ensures the connection between the pixel electrode layer 80 and the array structure layer 20.

In addition, due to the third notch 53, the area between the first protrusion 70 and the first surface 403 changes from a square structure into a trapezoidal structure. This increases the capacity for holding the color resistor and thus prevents the color resistor from leaking through the second opening 42.

The third surface 403 could be a curved structure. For example, the third surface 403 could be a concave or a convex surface.

Please note, the third notch 53 is not limited to be used in the embodiment shown in FIG. 12. It could be applied to each of the above-mentioned embodiments.

In the top views of the above embodiments, the TFT is shown as a shadowed structure underneath the inner color resistor material in the first opening. This is for clearly indicating where the first opening is. In the actual implementation, the TFT is covered by the color resistor material and thus cannot be seen from the top view.

The present disclosure further provides a display device. The display device comprises a backlight module and the above-mentioned display panel on the backlight module. The operations of the display device are similar or identical to the operations of the above-mentioned display panel and thus further illustration is omitted here.

The present disclosure proposes a display panel and a display device. The display device comprises a backlight module and an above-mentioned display panel of positioned on the backlight module. The display panel includes a first base plate, a second base plate positioned oppositely to the first substrate, and a liquid crystal layer positioned between the first base plate and the second base plate. The first base plate comprises a first substrate, an array structure layer on the first substrate, a color resistor layer on the array structure layer and a pixel electrode layer on the color resistor layer. The color resistor layer comprises at least three color resistor blocks, each of which has a first opening. A first via is within the first opening. At least one compensation portion is positioned near a side edge of the first opening. The pixel electrode layer is electrically connected to the array structure layer through the first via. The present disclosure sets a compensation portion close to the edge of the first opening. Therefore, when the first via, for connecting the pixel electrode layer and the source/drain, is formed in the first opening, the material of the color resistor close to the first opening is prevented from flowing into the first opening. This increases the distance between the first via and the edge of the first opening and makes the size of the first opening comply with the design rule of the pixel. This raises the display effect of the product.

Above are embodiments of the present disclosure, which does not limit the scope of the present disclosure. Any modifications, equivalent replacements or improvements within the spirit and principles of the embodiment described above should be covered by the protected scope of the invention.

What is claimed is:

1. A display panel, comprising a first base plate, a second base plate positioned oppositely to the first substrate, and a liquid crystal layer positioned between the first base plate and the second base plate;
    wherein the first base plate comprises a first substrate, an array structure layer on the first substrate, a color resistor layer on the array structure layer and a pixel electrode layer on the color resistor layer;
    wherein the color resistor layer comprises at least three color resistor blocks, each of the color resistor blocks has a first opening;
    wherein a first via is within the first opening;
    wherein at least one compensation portion is positioned near a side edge of the first opening;
    wherein the pixel electrode layer is electrically connected to the array structure layer through the first via,
    wherein the compensation portion comprises a first notch, and the first notch and the first opening have an overlapped region;
    wherein an orthographic projection of the first notch onto the first opening is within the first opening or a color resistor region adjacent to the first opening;
    wherein the compensation portion comprises the first notch far away from the color resistor block and a second notch close to the color resistor block; and wherein a cross-sectional area of the first notch on a first cross-section or a second cross-section is smaller than a cross-sectional area of the second notch on the first cross-section or the second cross-section.

2. The display panel of claim 1, wherein the first opening comprises a first side surface and a second side surface adjacent and vertical to the first side surface;
wherein a cross-sectional area of the first notch on a first cross-section gradually increases along a direction toward to the second side surface or along a direction toward to the first side surface or along both the direction toward to the second side surface and along the direction toward to the first side surface;
wherein the first cross-section and the second side surface are parallel.

3. The display panel of claim 1 wherein a shape of the first notch on a first cross-section or a second cross-section comprises a trapezoid, a square, or a rectangular.

4. The display panel of claim 1, wherein the compensation portion comprises a blocking layer located at an outer ring of the first opening and the blocking layer is closely adjacent to the color resistor layer.

5. The display panel of claim 4, wherein a distance between the first substrate and a first surface of the blocking layer comparatively far from the first substrate is larger than a distance between the first substrate and a surface of the color resistor layer comparatively far from the first substrate;
wherein a second surface of the blocking layer that is comparatively close to the first substrate extends from the first opening and a contact surface of the first via to the array structure layer.

6. The display panel of claim 5, wherein the second surface of the blocking layer contacts a passivation layer of the array structure layer.

7. The display panel of claim 1, further comprising a second opening, wherein a first side of the second opening is close to the first opening and a second side of the second opening is close to an adjacent color resistor.

8. A display device, comprising:
a backlight module; and
a display panel positioned on the backlight module, the display panel comprising a first base plate, a second base plate positioned oppositely to the first substrate, and a liquid crystal layer positioned between the first base plate and the second base plate;
wherein the first base plate comprises a first substrate, an array structure layer on the first substrate, a color resistor layer on the array structure layer and a pixel electrode layer on the color resistor layer;
wherein the color resistor layer comprises at least three color resistor blocks, each of the color resistor blocks has a first opening;
wherein a first via is within the first opening;
wherein at least one compensation portion is positioned near a side edge of the first opening;
wherein the pixel electrode layer is electrically connected to the array structure layer through the first via;
wherein the compensation portion comprises a first notch, and the first notch and the first opening have an overlapped region;
wherein an orthographic projection of the first notch onto the first opening is within the first opening or a color resistor region adjacent to the first opening;
wherein the compensation portion comprises the first notch far away from the color resistor block and a second notch close to the color resistor block; and
wherein a cross-sectional area of the first notch on a first cross-section or a second cross-section is smaller than a cross-sectional area of the second notch on the first cross-section or the second cross-section.

9. The display device of claim 8, wherein the first opening comprises a first side surface and a second side surface adjacent and vertical to the first side surface;
wherein a cross-sectional area of the first notch on a first cross-section gradually increases along a direction toward to the second side surface or along a direction toward to the first side surface or along both the direction toward to the second side surface and along the direction toward to the first side surface;
wherein the first cross-section and the second side surface are parallel.

10. The display device of claim 8 wherein a shape of the first notch on a first cross-section or a second cross-section comprises a trapezoid, a square, or a rectangular.

11. The display device of claim 8, wherein the compensation portion comprises a blocking layer located at an outer ring of the first opening and the blocking layer is closely adjacent to the color resistor layer.

12. The display device of claim 11, wherein a distance between the first substrate and a first surface of the blocking layer comparatively far from the first substrate is larger than a distance between the first substrate and a surface of the color resistor layer comparatively far from the first substrate;
wherein a second surface of the blocking layer that is comparatively close to the first substrate extends from the first opening and a contact surface of the first via to the array structure layer.

13. The display device of claim 12, wherein the second surface of the blocking layer contacts a passivation layer of the array structure layer.

14. The display device of claim 8, wherein the display panel further comprises a second opening, wherein a first side of the second opening is close to the first opening and a second side of the second opening is close to an adjacent color resistor.

* * * * *